United States Patent
Knopf

(10) Patent No.: US 10,605,327 B2
(45) Date of Patent: Mar. 31, 2020

(54) TORSIONAL VIBRATION DAMPER HAVING A BEARING DEVICE AND METHOD FOR PRODUCING THE BEARING DEVICE

(71) Applicant: Hasse & Wrede GmbH, Berlin (DE)

(72) Inventor: Florian Knopf, Berlin (DE)

(73) Assignee: Hasse & Wrede GmbH, Berlin (DE)

(*) Notice: Subject to any disclaimer, the term of this patent is extended or adjusted under 35 U.S.C. 154(b) by 0 days.

(21) Appl. No.: 15/777,230

(22) PCT Filed: Nov. 15, 2016

(86) PCT No.: PCT/EP2016/077694
§ 371 (c)(1),
(2) Date: May 18, 2018

(87) PCT Pub. No.: WO2017/085048
PCT Pub. Date: May 26, 2017

(65) Prior Publication Data
US 2018/0328408 A1  Nov. 15, 2018

(30) Foreign Application Priority Data
Nov. 18, 2015  (DE) .......... 10 2015 119 960

(51) Int. Cl.
*F16F 15/16* (2006.01)
*F16C 33/02* (2006.01)
(Continued)

(52) U.S. Cl.
CPC .......... *F16F 15/173* (2013.01); *F16C 33/046* (2013.01); *F16C 17/10* (2013.01);
(Continued)

(58) Field of Classification Search
CPC .... F16F 15/1208; F16F 15/14; F16F 15/1457; F16F 15/1485; F16F 15/16; F16F 15/163;
(Continued)

(56) References Cited

U.S. PATENT DOCUMENTS 2,834,225 A * 5/1958 Carter ............... F16F 15/173
74/573.13
3,262,334 A   7/1966 Edwards
(Continued)

FOREIGN PATENT DOCUMENTS

CN  1533483 A  9/2004
DE  1 245 225 A  7/1967
(Continued)

OTHER PUBLICATIONS

Machine translation of DE 102012107554 A1 obtained on Sep. 24, 2018.*
(Continued)

*Primary Examiner* — Adam D Rogers
(74) *Attorney, Agent, or Firm* — Crowell & Moring LLP

(57) ABSTRACT

A viscous torsional vibration damper has an annular damper housing defining a damper chamber; an inertia ring in the damper chamber; a bearing device supporting the inertia ring with one or more bearing elements. At least one bearing element is a ring not circumferentially closed in a mounted state. A shear gap between the inertia ring and the damper housing is filled with a viscous fluid. The at least one bearing element that is not circumferentially closed is cut to length from a strip. In order to produce the bearing element, a strip is provided, on which one or more axial bearing sections and one or more radial bearing sections and preferably one or more webs are formed. Then, the bearing element is cut to length from the strip and the bearing element is inserted into an open damper housing and laid on a bearing seat.

17 Claims, 7 Drawing Sheets

(51) Int. Cl.
*F16C 17/10* (2006.01)
*F16F 15/173* (2006.01)
*F16F 33/04* (2006.01)
*F16C 33/20* (2006.01)

(52) U.S. Cl.
CPC .......... *F16C 33/20* (2013.01); *F16C 2361/53* (2013.01); *F16F 2226/04* (2013.01); *F16F 2230/32* (2013.01)

(58) Field of Classification Search
CPC ........ F16F 15/167; F16F 15/173; F16F 15/36; F16F 15/366; F16F 2226/04; F16F 2230/32; Y10T 74/2126; F16C 17/10; F16C 33/20; F16C 2361/53; F16C 33/046
See application file for complete search history.

(56) References Cited

U.S. PATENT DOCUMENTS

| | | | |
|---|---|---|---|
| 3,448,830 A * | 6/1969 | Desmond | F16F 15/173 188/322.5 |
| 3,552,230 A | 1/1971 | McLean | |
| 5,058,453 A | 10/1991 | Graham et al. | |
| 5,862,897 A * | 1/1999 | Allport | F16F 15/173 188/378 |
| 6,026,709 A | 2/2000 | Depp et al. | |
| 6,993,996 B2 | 2/2006 | Herrmann | |
| 7,117,709 B2 | 10/2006 | Goetzmann et al. | |
| 2005/0000767 A1 | 1/2005 | Herrmann | |
| 2016/0033004 A1 * | 2/2016 | Knopf | F16F 15/173 188/290 |
| 2018/0187746 A1 * | 7/2018 | Bohmeyer | F16F 15/173 |
| 2019/0113101 A1 * | 4/2019 | Steidl | F16F 15/126 |

FOREIGN PATENT DOCUMENTS

| | | | | |
|---|---|---|---|---|
| DE | 195 19 261 A1 | 12/1996 | | |
| DE | 197 08 082 A1 | 9/1998 | | |
| DE | 198 55 420 A1 | 6/2000 | | |
| DE | 197 08 082 C2 | 8/2001 | | |
| DE | 10046737 C1 * | 1/2002 | .......... | F16F 15/1492 |
| DE | 100 61 382 C1 | 9/2002 | | |
| DE | 101 26 477 C1 | 12/2002 | | |
| DE | 10200904145 A1 * | 3/2011 | ............ | F16F 15/173 |
| DE | 102012107554 A1 * | 2/2014 | ............ | F16F 15/173 |
| EP | 0 745 784 B1 | 5/2000 | | |
| EP | 2824362 A1 * | 1/2015 | ............ | F16F 15/173 |
| GB | 1 307 607 | 2/1973 | | |
| GB | 2 344 398 B | 6/2000 | | |
| JP | 55-55645 U | 4/1980 | | |
| JP | 57-68946 U | 4/1982 | | |
| JP | 2007177852 A * | 7/2007 | | |
| WO | WO 90/13758 A1 | 11/1990 | | |
| WO | WO-2019030174 A1 * | 2/2019 | ............ | F16F 15/173 |

OTHER PUBLICATIONS

Machine translation of DE 19519261 A obtained on Sep. 24, 2018.*
International Search Report (PCT/ISA/210) issued in PCT Application No. PCT/EP2016/077694 dated Mar. 3, 2017 with English translation (six pages).
German-language Written Opinion (PCT/ISA/237) issued in PCT Application No. PCT/EP2016/077694 dated Mar. 3, 2017 (eight pages).
German-language Office Action issued in counterpart German Application No. 10 2015 119 960.2 dated Jun. 7, 2016 (seven pages).
Cover page of EP 0 423 243 published Apr. 24, 1991 (one page).
International Preliminary Report on Patentability (PCT/IB/326 & PCT/IB/373) issued in PCT Application No. PCT/EP2016/077694 dated May 31, 2018, including English translation of document C2 (German-language Written Opinion (PCT/ISA/237) previously filed on May 18, 2018) (ten (10) pages).
Chinese-language Office Action issued in counterpart Chinese Application No. 201680078563.X dated May 15, 2019 with partial English translation (nine (9) pages).

* cited by examiner

TORSIONAL VIBRATION DAMPER HAVING A BEARING DEVICE AND METHOD FOR PRODUCING THE BEARING DEVICE

BACKGROUND AND SUMMARY OF THE INVENTION

The invention relates to a torsional vibration damper and to a method for producing a bearing element for a bearing device for a torsional vibration damper.

Torsional vibration dampers of the generic type serve for damping torsional vibrations on a machine shaft—frequently an engine crankshaft. On the machine shaft, the damper housing of the torsional vibration damper is connected to a machine shaft—frequently an engine crankshaft—in a torsionally rigid manner, the torsional vibrations of which are to be dampened. The damper housing and the inertia ring follow the mean rotational speed of the machine shaft without slip. Their torsional vibrations by contrast, which are superimposed on the uniform rotation, are initially only superimposed on the damper housing. The inertia ring would rotate uniformly if a viscous fluid—for example a silicone oil—which fills the narrow shear gap, would not couple it to the damper housing. This coupling is elastic and subject to damping. Consequently, relative torsion angles of for example up to ±1 angular degree occur between damper housing and inertia ring in phase with the exciting shaft vibration. Since the inertia ring can thus rotate slightly relative to the damper housing in the damper housing chamber, at least one bearing device comprising one or more bearing elements is usually required for its mounting.

A substantial requirement in designing the bearing device of a torsional vibration damper is that the inertia ring located in the damper chamber is mounted so as to be freely moveable with the bearing device and that any collision with the damper chamber or with the damper housing, which forms the damper chamber, is excluded. This is realized by determining suitable nominal values and tolerances of inertia ring, bearing device and damper chamber. Frequently, the installation space for the torsional vibration damper on a motor or an internal combustion engine is limited. At the same time, because of the further development of motors or internal combustion engines, the function requirements of the torsional vibration damper increase.

In particular loosely inserted bearing elements have proved themselves as bearing device, which bearing elements form a sliding bearing between inertia ring and damper chamber. Accordingly it is known to combine a radial ring that is slotted at a point on the circumference thereof with two axial rings—EP 0 423 243—or to provide a multiplicity of axial guide platelets as bearing elements as bearing device—GB 1 307 607.

From DE 195 19 261 A1 a torsional vibration damper with a bearing device for guiding an inertia ring in a damper housing is known, in which as bearing device at least one bearing element that is L-shaped in the cross section is provided, which is inserted into the damper housing in such a manner that a radial bearing section of the L-shaped bearing element mounts and guides the inertia ring relative to the damper housing in the radial direction and that an axial bearing section of the L-shaped bearing element ensures an axial mounting and guiding. Between the inertia ring and the damper housing there are shear gaps which are filled with the viscous fluid. According to versions of this publication it is provided that two of the L-shaped bearing elements are arranged in the inner or outer circumferential gap of the inertia ring, or that one of the L-shaped bearing elements is combined with an axial strip. The L-shaped bearing elements can be designed as a circumferentially closed angular ring or designed to be slotted at a point on the circumference thereof.

From the generic DE 101 26 477 C1 it is known that the L-shaped bearing elements at a point on the circumference have a butt joint, which is bridged by at least one or more material webs, so that a circumferentially closed ring is formed. Preferentially, these material webs are configured in the manner of a predetermined breaking point so that they tear open or are elastically-plastically deformed when the bushing is subjected to a thermal increase in length. According to a further version of DE 101 26 477 C1, the butt joint is bridged by one or two material webs formed as tearing webs, which is/are aligned with the radial bearing arrangement and/or the axial bearing arrangement. It is likewise known that the butt joint is bridged by a material web designed as meander web and that the material web is a film web. According to the specification of DE 101 26 477 C1, the rings which are still circumferentially closed prior to the assembly can be mounted more easily as rings which are not circumferentially closed since they cannot become entangled. In addition, the predetermined breaking point makes it possible to employ the rings with slightly different bearing seat diameters. However, it is problematic that for bearing seat diameters that are not only slightly different, different bearing rings still have to be produced.

The object of the invention is to solve this problem.

The invention solves this object by providing a viscous torsional vibration damper having the following features: an annular damper housing, bounding a damper chamber; an inertia ring arranged in the damper chamber; a bearing device mounting the inertia ring in the damper housing, which comprises at least one or more bearing elements, wherein at least one of the bearing elements is formed as a ring that is not circumferentially closed in an assembled state; a shear gap filled with a viscous fluid between the inertia ring and the damper housing, wherein one or more axial bearing sections and one or more radial bearing sections are provided circumferentially distributed on the at least one bearing element formed as a ring that is not circumferentially closed, and wherein the bearing element formed as a ring that is not circumferentially closed is cut to length form a strip.

The length of the piece cut to length, which forms the bearing element, corresponds to the circumference of the bearing seat of the damper housing so that the bearing element on the one hand can be easily mounted to this bearing seat and on the other hand no gap that is too large forms between the ends of the bearing element, which would negatively affect the bearing function. "Not circumferentially closed" means that the ends of the bearing element are not connected to one another in a firmly bonded manner.

In addition, the invention provides a method for producing a bearing element for a bearing device of such a viscous torsional vibration damper, with the following steps:

Step A): providing a strip on which at least one or both of the following features are present: one or more axial bearing sections and one or more radial bearing sections and preferentially one or more webs, in particular radial webs; which if applicable—i.e. if present—connect the multiple axial bearing sections and/or radial bearing sections with one another;

Step B): cutting the bearing element to length from the provided strip; and

Step C): laying the bearing element cut to length from Step C) into a provided open damper housing on a bearing seat of the damper housing. In Step C) the bearing element cut to length—if it does not yet have the required radius—is additionally bent into the shape of a ring that is not circumferentially closed. Step C) can also comprise that the bearing element is placed on the bearing seat jointly with an inertia ring. Preferentially, however, the bearing element is placed into the damper housing before the inertia ring.

With the strip material or strip, bearing elements for bearing seats of different diameters can be realized. This saves tool costs since different tools for different bearing seat circumferences/diameters for producing the annular bearing elements of different circumference no longer have to be provided. The bearing element is simply cut to a length corresponding to the circumference of the bearing seat in a manner corresponding to the respective circumference of the bearing element. The production logistics are likewise simplified. This is accompanied by a saving of storage costs. In addition, prototype construction time is shortened and assembly errors are avoided. According to the invention, multiple axial bearing sections and multiple radial bearing sections are additionally provided on the at least one bearing element. This brings with it a number of advantages. Since the axial bearing sections and/or the radial bearing sections no longer extend over the entire or almost the entire circumference of the bearing element, but rather merely three or more axial and/or radial bearing sections are provided distributed over the circumference, the space filled in the shear gap by the respective bearing element is reduced and additional space is accordingly created, which can be filled by the viscous medium and in which a viscous coupling between the inertia ring and the damper housing is possible. This makes it possible to maximize the utilizable shear gap and to optimize the connection between the inertia ring and the damper housing. Sections on which during operation a slide bearing between the damper housing and the inertia ring can be continuously realized in the radial direction by these sections are described as the axial bearing sections and/or as the radial bearing sections.

It is additionally advantageous and practical to cut multiple of the bearing elements of a viscous torsional vibration damper to length in a simple manner from a single strip. However, strips of a different type can also be provided when the bearing elements cannot all be cut to length from the same strip, for example since their cross section is different.

In particular when a bearing element located, with respect to the inertia ring, axially outside is to be realized, the strip cut to length, because of its bending stiffness, hugs the outer damper housing towards the outside when it is inserted into the damper housing, so that the inertia ring in a step during the production of the torsional vibration damper can be easily placed into the damper housing.

According to an advantageous version, the at least one bearing element that is not circumferentially closed is cut to length from a strip which is provided as a straight strip. However, it is also advantageous when the at least one bearing element is cut to length from a bent strip, wherein the bend of the strip preferentially has a radius that is greater than that of the bearing seat. This strip can for example be provided on a reel like a continuous strip, the diameter of which reel is preferentially significantly larger than that of the bearing elements to be realized.

The strip can consist of plastic and can preferentially be provided in a cost-effective manner in an extrusion method.

It is advantageous to assemble the bearing element before the inertia ring. However, it is also conceivable—although less preferred—to place the bearing element against the inertia ring and to then place this preassembled unit in the still open damper housing. This version can be selected when the or a plurality of the bearing element(s) are to be assembled in inner corner regions of a housing.

Following this—for completing the production of the torsional vibration damper as such—the provided open damper housing is preferentially closed for example with a cover in a further step, wherein a filler opening for the viscous medium still remains. Following this, the viscous medium is filled in and the filler opening of the damper housing closed. A complete method for assembling a torsional vibration damper from the provided elements damper housing with cover, bearing device with bearing elements produced according to the above method, inertia ring and viscous medium is also realized in this manner.

Preferentially, at least three of the axial bearing sections and/or of the radial bearing sections are provided on the one or the two or more bearing elements, distributed over the circumference thereof.

In order to configure the regions which are additionally filled with the viscous medium to be large in size, the added circumferential length of the axial and/or radial bearing sections according to a preferred embodiment amounts to less than 50%, in particular less than 40% and particularly preferably less than 30% of the circumference of the entire bearing element.

Preferably, in each case circumferentially distributed the radial bearing sections and the axial bearing sections complement one another to form bearing sections that are L-shaped in the cross section, which are provided on the bearing element distributed over the circumference. By way of such L-shaped bearing sections, the inertia ring is particularly favorably centered and guided. Furthermore, the assembly with this configuration proves to be very simple since the bearing element configured in this manner can be easily placed into the shear gap before the damper housing that is generally initially open on one side for the assembly is closed once the bearing elements and the inertia ring have been inserted and filled with the viscous fluid at a filler opening still to be closed later on.

For realizing a good bearing it is practical when two of the bearing elements are arranged in the damper chamber. Although more of the bearing elements can be theoretically provided, two bearing elements for mounting the inertia ring are generally sufficient. This also makes the assembly simple.

It is advantageous if the damper chamber has a substantially rectangular cross section with inner and outer corner regions. These corner regions then preferentially and simply form the bearing seats for the bearing elements. Then, according to one version, two of the bearing elements can be arranged in the outer corner regions of the damper chamber between the damper housing and the inertia ring. This configuration can be assembled particularly easily. This configuration is advantageous but not mandatory. Other cross sections such as C-shapes and the like are also conceivable.

Alternatively, two of the bearing elements can be arranged in the inner corner regions of the damper chamber between the damper housing and the inertia ring.

Finally it is also conceivable that one of the bearing elements is arranged in one of the outer corner regions and a further one of the bearing elements is arranged in one of the inner corner regions of the damper chamber between the damper housing and the inertia ring. Here it is preferred if the bearing elements are arranged in corner regions which are located diagonally opposite one another in the damper chamber since this favorably centers the inertia ring.

Preferentially, the bearing elements of the bearing device are arranged between the damper housing and the inertia ring without preload in order to ensure a good mounting. This is particularly preferred since in this manner a good mounting is ensured. Plastic is preferentially employed as material for the bearing elements of the bearing device. The viscous fluid is preferably a silicone oil. However, in individual cases, the bearing elements can also be assembled with preload.

Within the scope of the invention an embodiment of the bearing device can also be realized in which at least one of the bearing elements merely comprises one radial bearing section and radial webs of smaller strip thickness connecting these. These bearing elements are then preferably—but not mandatorily—combined with bearing elements with which in each case distributed over the circumference the radial bearing sections and the axial bearing sections complement one another to form bearing sections that are L-shaped in the cross section. Then, one of the bearing elements guides the ring preferentially in the radial and the axial direction and the other one guides the inertia ring only in one of these directions.

BRIEF DESCRIPTION OF THE DRAWINGS

In the following, the invention is described in more detail by way of exemplary embodiments making reference to the drawings, in which:

FIG. 2 shows in a) a perspective view of a bearing element formed as a ring that is not circumferentially closed and in b) a detail view of the bearing element from FIG. 2a;

FIG. 4 shows in a) a perspective view of a further bearing element formed as a ring that is not circumferentially closed and in b) a detail view of the bearing element from FIG. 4a;

DETAILED DESCRIPTION OF THE DRAWINGS

Figure 1:
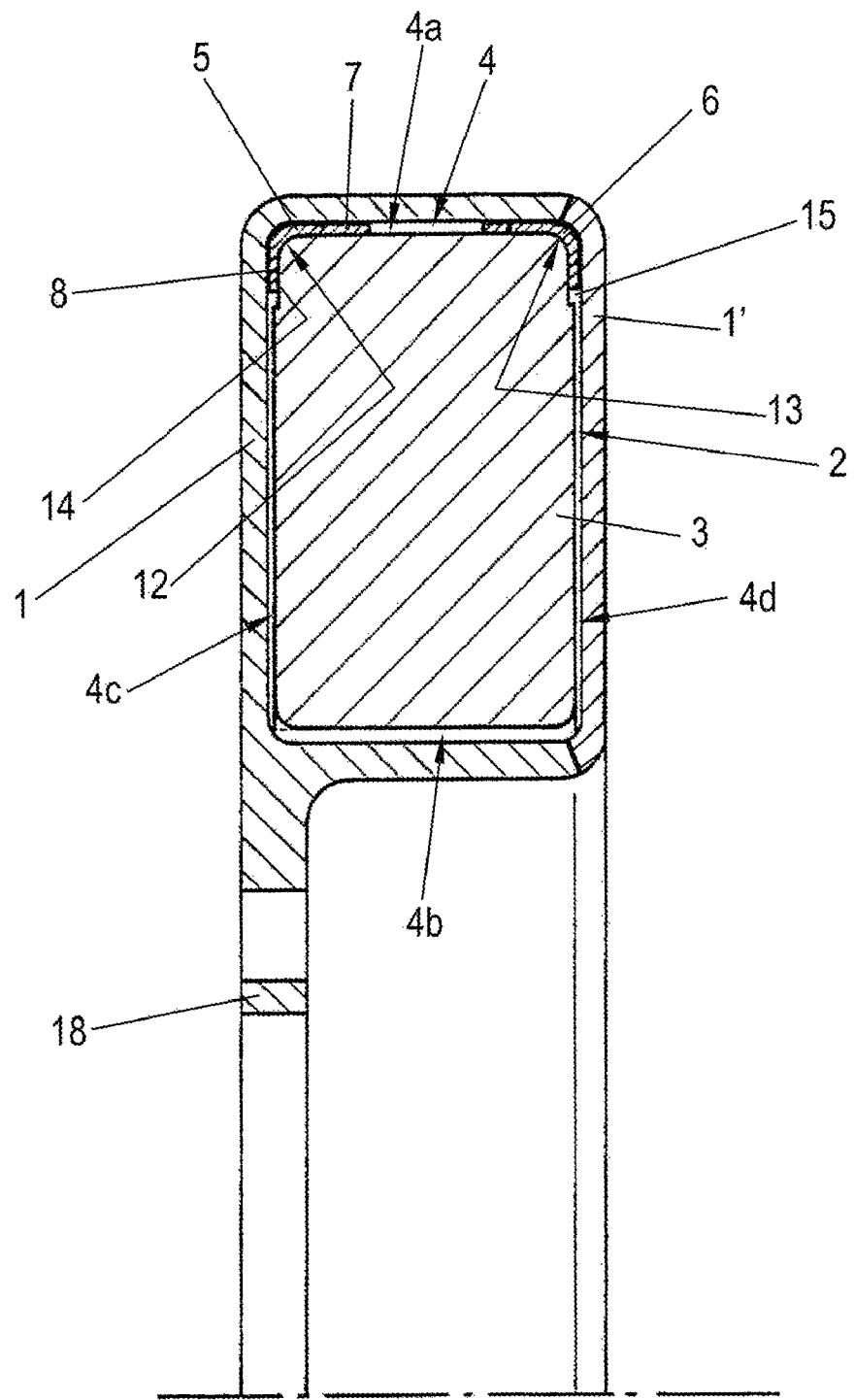
FIG. 1 shows a sectional view through a ring half of a first annular viscous torsional vibration damper.

FIG. 1 shows a viscous torsional vibration damper with an annular damper housing 1, which bounds a damper chamber 2 and which comprises a cover 1' closing the same.

The damper housing 1 can be rotatably connected to a machine shaft M—in particular an engine crankshaft—which is not shown here, the torsional vibrations of which are to be dampened.

A circumferentially closed inertia ring 3 is inserted into the damper chamber 2. Here, this inertia ring 3 in a preferred—but not mandatory—configuration has a substantially rectangular cross section. The inertia ring 3 is mounted in the damper housing 1 by a bearing device. The same is preferentially loosely—i.e. without preload—arranged between the inertia ring 3 and the inner wall of the damper housing 1. Between the inner wall of the damper housing 1 and the inertia ring 3 a shear gap 4 is formed in the damper chamber 2, which is filled with a viscous damping medium, in particular a viscous fluid.

The bearing device comprises bearing elements 5, 6 which are formed at a point on the circumference as rings that are not circumferentially closed. The bearing elements 5, 6 serve for rotatably mounting the inertia ring 3 in the damper housing 1 relative to the damper housing 1. These bearing elements 5, 6 preferentially consist of plastic and in each case form sliding bearings between the bearing housing 1 and the inertia ring 3. The bearing elements 5, 6 are preferentially formed in one piece which makes the handling particularly easy, or in further embodiments are formed in two or more pieces.

Figure 2A:
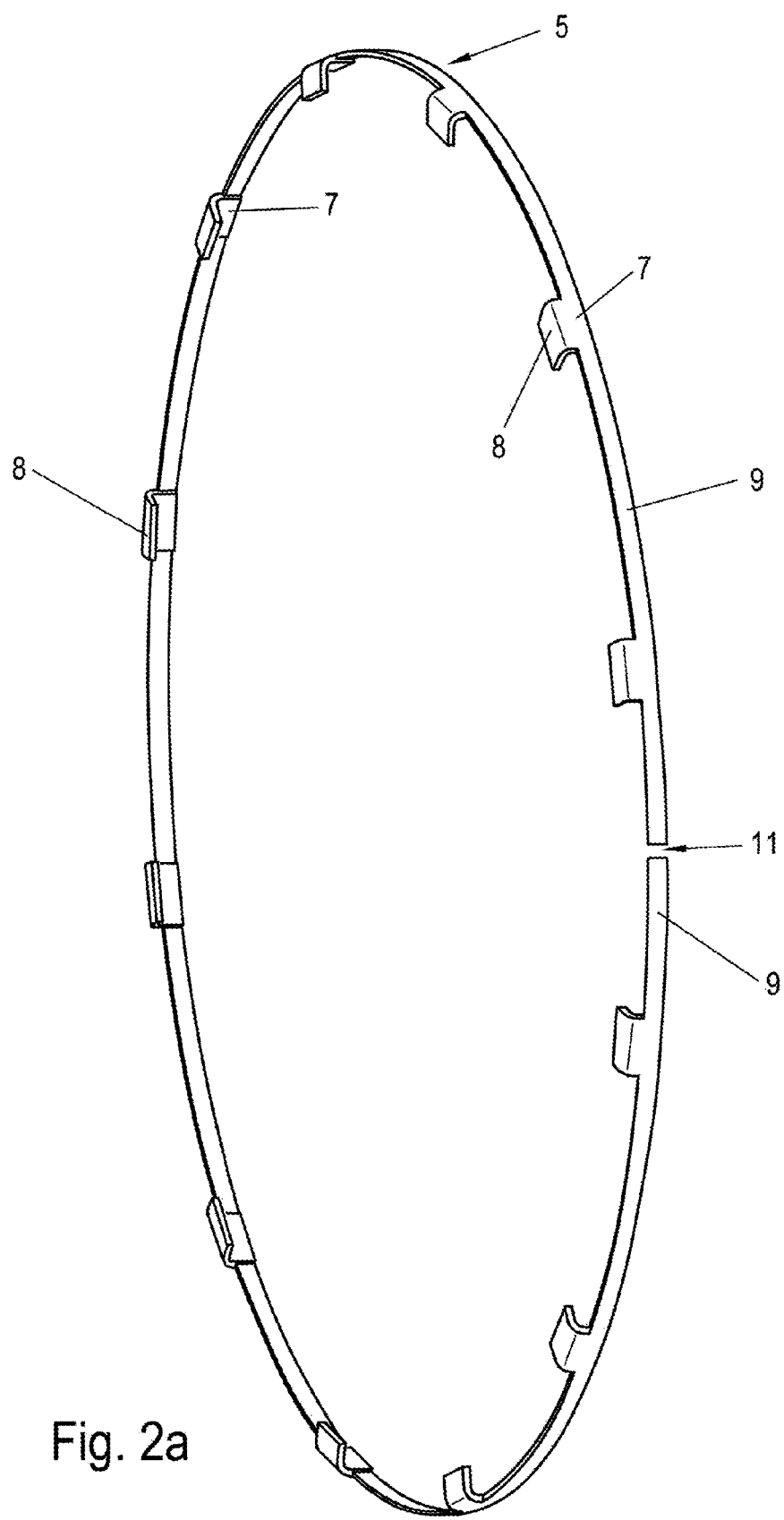

FIG. 2a shows the bearing element 5. The assembled state is illustrated, although the damper housing 1 is not shown here. The other bearing element 6 in this case is designed so as to be identical to the bearing element 5 so that the following description also applies to the bearing element 6. The identical design of the bearing elements 5, 6 has the advantage that only one type of the bearing elements 5 has to be provided for the production. However, it is also conceivable to configure the two bearing elements 5, 6 differently so that, when the inertia ring 3 in the cross section is not configured so as to be rectangular but rather for example is stepped, so that a mounting in the axial direction has to be realized on different diameters (not shown here).

Except for a point on its circumference, the bearing element 5 is formed so as to be annular and, distributed over the circumference, includes at least two or more axial bearing sections 8 and/or at least two or more radial bearing sections 7. According to FIG. 1, the axial bearing sections 8 and the radial bearing sections 7 are arranged so as to be distributed over the circumference preferably in corresponding angular positions so that—viewed in the cross section of FIG. 1—L-shaped bearing sections distributed over the circumference are formed, the legs of which in each case form one of the axial bearing sections 8 and one of the radial bearing sections 7.

In the shear gap 4, shear gap axial regions 4c, 4d and shear gap radial regions 4a, 4b are formed between the damper housing 1 and the inertia ring 3. With all configurations, the axial bearing sections 8 are located in the shear gap axial regions 4c or 4d and the radial bearing sections 7 in the shear gap radial regions 4a or 4b. "Radial" in torsional vibration damper technology and in this application in the figures and the description describes the direction of an engine shaft with constant radius (not shown) (which corresponds to the direction of the lower dash-dotted line in FIG. 1), "axial" describes the direction perpendicular thereto with variable radius.

The L-shaped bearing sections 5, each with one of the radial bearing sections 7 and one of the axial bearing sections 8, do not extend over the entire circumference of the ring-shaped bearing element 5. These are rather provided only in sections. Added up, these preferentially extend in the circumferential direction over less than 50%, preferentially over less than 40%, and in particular less than 30% of the entire circumference of the bearing element 5.

Adjacent radial bearing sections 7 are connected to one another via radial webs 9 in the circumferential direction.

According to FIG. 2a, the bearing element 5 is not formed/produced so as to be circumferentially closed, but rather so as to be open at a point on its circumference. At this point, a gap 11 is formed in the assembled state. In the assembled state, this gap can be very small and tend to zero. When the strip is very thin, even an overlapping of the ends (not shown) is theoretically possible. The design as a ring which is not circumferentially closed makes it possible to offset tolerances in an easy manner. The bearing element 5 has not been directly produced as a ring that is not circumferentially closed, as proposed by EP 0 423 243 B1. This is because this would also require providing separate production tools for the bearing elements for different radii.

Figure 6:
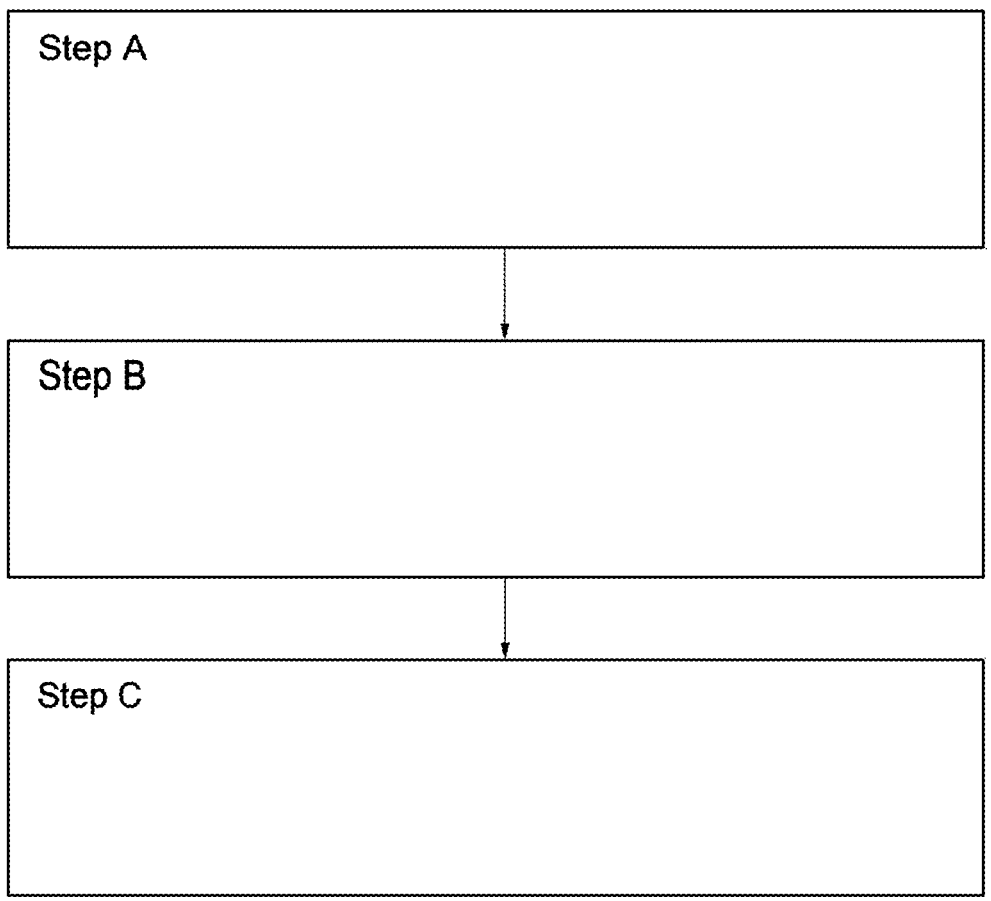
FIG. 6 shows a flow diagram which illustrates the sequence of a production method according to the invention.

The preferred manner of the production of the bearing element 5 according to the invention avoids this. Preferentially, —see also FIG. 6 in this regard—the following steps are carried out:

Step A):

In Step A) a strip is provided on which at least one or both of the following features are present:
one of the axial bearing sections 8 or a plurality of axial bearing sections 8 and/or
a radial bearing section 7 or a plurality of radial bearing sections 7.
In addition, one or a plurality of
axial webs; and/or
radial webs 9 are preferentially formed on the strip, which if applicable connect the multiple axial bearing sections 8 and/or radial bearing sections 7 to one another.

The strip provided in Step A) can be straight or slightly bent. In the latter case, the strip can be wound onto a reel like a type of "continuous strip", which further simplifies handling. The radius of the bend of the provided strip in this case is larger than that of the bearing seat.

Step B):

In Step B) the bearing element 5 is cut to length from the provided strip according to the respective circumference of a bearing seat in a damper housing 1. According to FIG. 1, corner regions 12, 13 of the damper housing 1 each form one of the bearing seats.

Step C):

The at least one bearing element 5 cut to length in Step b) is inserted into the bearing seat of the damper housing 1 that is not yet closed by the cover 1'. Here it is advantageous to assemble the bearing element or elements 5, 6 before the inertia ring 3.

Following this, the damper housing 1 provided for completing the production of the torsional vibration damper is closed with the cover 1', wherein a filler opening for the viscous medium still remains (not shown). After this, the viscous medium is filled in and the filler opening of the damper housing 1 closed.

In particular when a bearing element 5, 6 located, based on the inertia ring 3, axially outside is to be realized, the strip cut to length hugs the outer damper housing 1 towards the outside when being inserted into the damper housing 1 because of its bending stiffness so that the inertia ring 3 in a Step D) can be easily placed in the damper housing 1.

It is conceivable to cut multiple of the bearing elements 5, 6 of the viscous torsional vibration damper to length from a single strip. However, strips of a different type can also be provided when the bearing elements 5, 6 cannot all be cut to length from the same strip.

With the strip material or strip, bearing elements for bearing seats (preferentially the corner regions of the damper housing 12, 13 and/or of the inertia ring 3) of different diameter can be realized. This saves tool and storage costs. The production logistics are also simplified. In addition, the prototype construction time is shortened and assembly errors avoided.

Since the bearing sections 7, 8 no longer extend over almost the entire circumference of the bearing element or bearing ring, but rather are only provided so as to be angularly distributed in sections, regions are created which can be additionally filled by the viscous medium so that additional regions compared with the generic prior art can be formed in which a viscous coupling between the inertia ring 3 and the damper housing 1 is possible. This makes it possible to maximize the shear gap and to optimize the coupling between the inertia ring 3 and the damper housing 1. In order to design the regions, which are to be additionally filled by the viscous medium, to be large in size, the added circumferential length of the axial bearing sections 8 and/or of the radial bearing sections 7 should preferentially amount to less than the mentioned 50% of the circumference, preferentially less than 40%, and in particular less than 30% of the bearing element and/or of the inertia ring 3.

Preferentially, the strip thickness X1 and/or Y1 of the axial bearing sections 8 and/or the radial bearing sections 7 is greater than the strip thickness X2 and/or Y2 in the region of the axial and radial webs 9 connecting the bearing sections. In addition, the axial width of the axial bearing sections 8 and/or the radial width of the radial bearing sections 7 is preferentially greater than in the bearing sections per se. This also brings with it the advantage of additional space for viscous fluid for coupling between the inertia ring 3 and the damper housing 1 in each case.

The bearing elements 5, 6 can be placed in the damper chamber 2 in the outer corner regions 12, 13 between the inertia ring 3 and the damper housing 1. For this purpose, the inertia ring 3 preferentially comprises radially and axially extending recesses 14, 15 in the region of the corresponding corner regions 12, 13, which recesses preferentially extend in each case radially or diagonally opposite, the depth of which is smaller than that of the strip thickness of the bearing elements 5, 6, which is advantageous in order to configure the shear gap 4 to be narrow and in order to keep the space taken up by the bearing elements 5, 6 small and to create a suitably dimensioned space for the viscous fluid in the shear gap 4. The corner regions 12, 13, here the recesses 14, 15, form one of the bearing seats each in this case.

Figure 3:
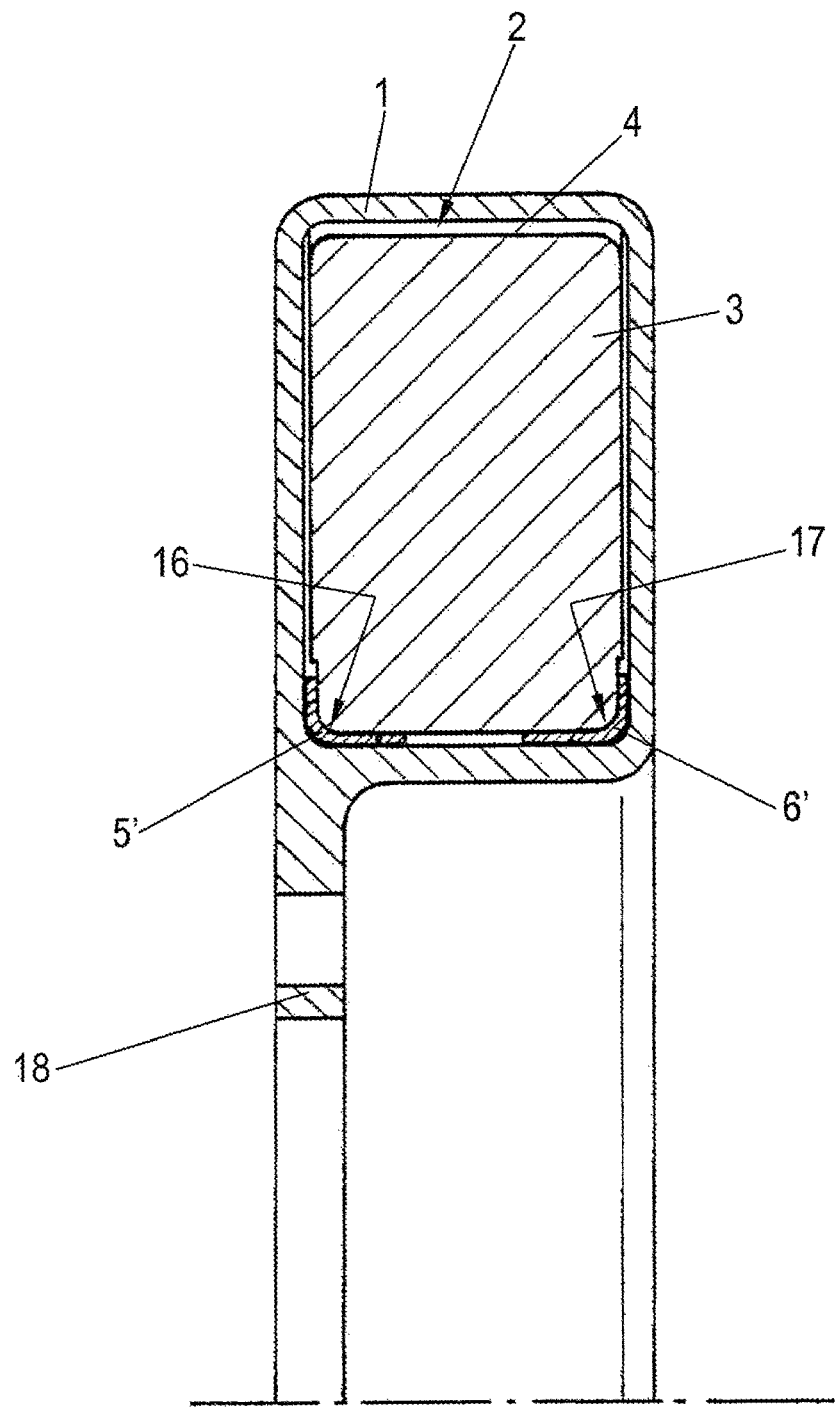
FIG. 3 shows a sectional view through a ring half of a second annular viscous torsional vibration damper.

FIG. 3 shows an alternative version of a torsional vibration damper in the case of which the bearing elements 5', 6' are formed in such a manner that they can be inserted into radially inner corner regions 16, 17 of the damper chamber 2 between two the inertia ring 3 and the damper housing 1. These bearing elements 5' and 6' as well as the torsional vibration damper are also produced according to the method described above. Here, the corner regions 16, 17 each form one of the bearing seats for the bearing elements 5', 6'.

Figure 4A:
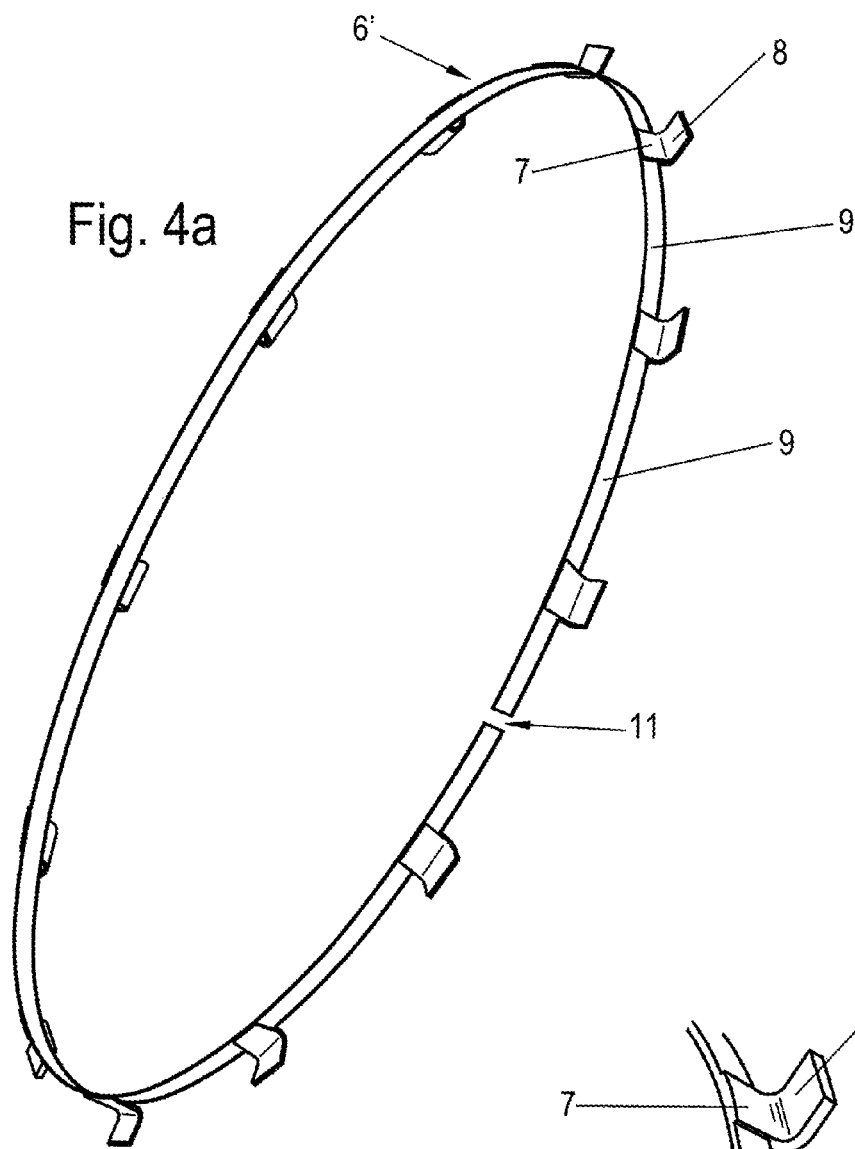
Figure 4B:
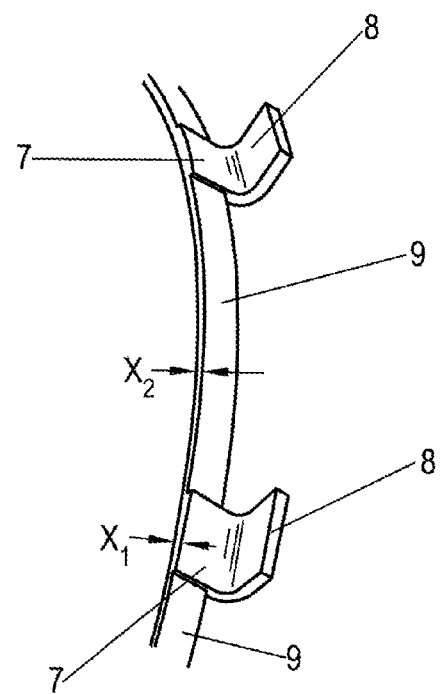

A bearing element 6' that is suitable for the construction of FIG. 3 is shown by FIG. 4. Illustrated is the assembled state although the damper housing 1 is not shown here. In this state, the bearing element of FIG. 4 is already inserted into a viscous torsional vibration damper as shown in FIG. 3. Otherwise, the construction of the viscous torsional vibration damper of FIG. 3 corresponds to that of FIG. 1.

Figure 2B:
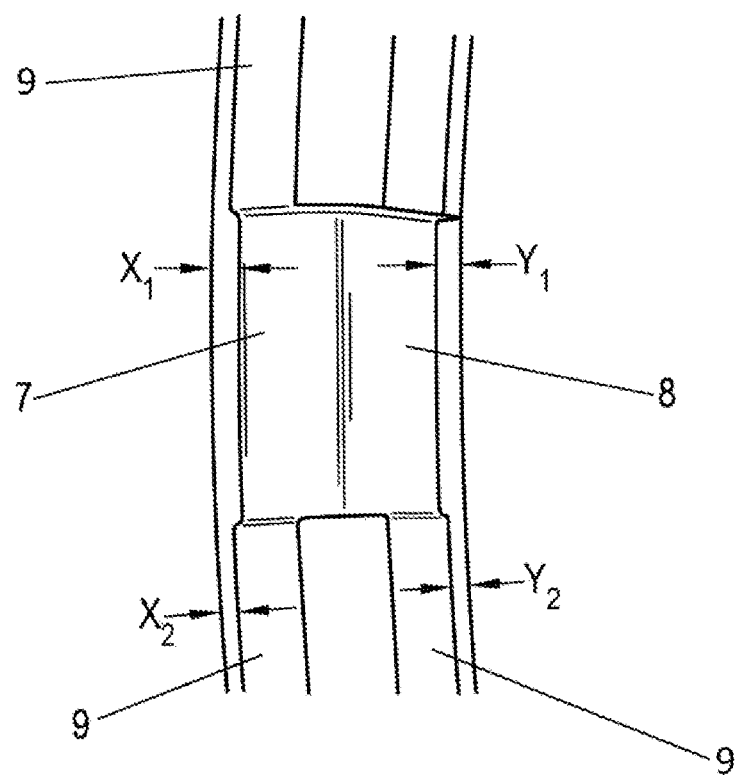
Figure 5:
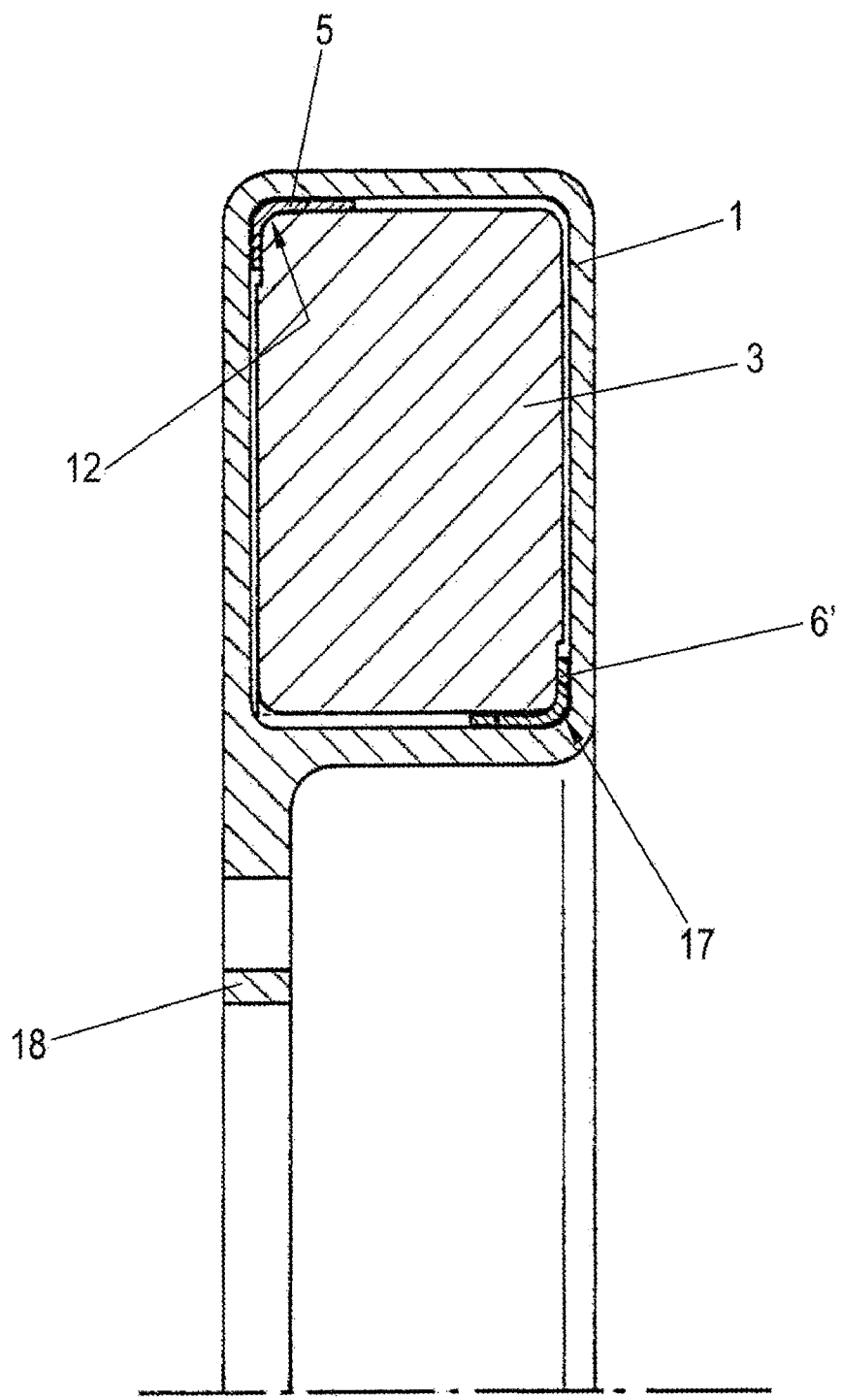
FIG. 5 shows a sectional view through a ring half of a third annular viscuc torsional vibration damper.

FIG. 5 shows a further version with which the one bearing element 5 is formed in the manner of FIG. 2 and is inserted into an outer corner region 12 of the damper chamber 2, whereas the other bearing element 6' is designed in the manner of FIG. 4, and is inserted in an inner corner region 17 of the damper chamber 2. Here, the bearing elements 5, 6 are located diagonally opposite one another, i.e. they are inserted into corner regions 12, 17 of the damper chamber 2 located diagonally opposite one another. The corner regions 11 and 17 and/or corresponding corner regions of the inertia ring 3 in this case each form the bearing seats for the bearing elements 5', 6'.

It is advantageous in each case to connect the axial bearing sections 8 and the radial bearing sections 7 of the bearing elements 5, 6 to one another not by axial webs and radial webs 9 but to provide radial webs 9 only. In this manner, the bearing element cut to length from the provided strip can be particularly favorably bent into a ring shape with the required diameter. For this reason it is provided in each case according to FIG. 2 and FIG. 4 that only the radial bearing sections 7 are connected to one another by radial webs 9.

Finally it is also conceivable to provide the axial bearing sections 8 and the radial bearing sections 7 not at the same points on the circumference but rather so as to be circumferentially offset relative to one another (not shown). In this case, for example, axial bearing sections 8 would be formed on the bearing element 5 of FIG. 2 at distances of 40° and radial bearing sections 7 angularly offset by 20° thereto, in each case. The axial and radial bearing sections 7, 8 in this case again have a greater strip thickness than the radial webs 9 connecting them.

According to FIGS. 1, 2 and 3, the damper housing 1 comprises in each case at least one section for assembly to the machine shaft (not shown). Here, this section is a flange 18 in each case which extends radially to the inside.

LIST OF REFERENCE NUMBERS

1 Damper housing
1' Cover
2 Damper chamber
3 Inertia ring
4 Shear gap
4a, b Shear gap radial regions
4c, 4d Shear gap axial regions
5, 5' Bearing element
6, 6' Bearing element
7 Radial bearing section
8 Axial bearing section
9 Radial web
11 Gap
12 Corner region
13 Corner region
14 Recess
15 Recess
16 Corner region
17 Corner region
18 Flange
X1, Y1 Strip thickness
X2, Y2 Strip thickness

What is claimed is:

1. A viscous torsional vibration damper comprising:
a) an annular damper housing, bounding a damper chamber;
b) an inertia ring arranged in the damper chamber;
c) a bearing device between the inertia ring and the damper housing, which comprises at least one bearing element, wherein at least one of the at least one bearing element is formed as a ring that is not circumferentially closed in an assembled state;
d) a shear gap filled with a viscous fluid between the inertia ring and the damper housing, wherein
e) one or more axial bearing sections and one or more radial bearing sections are provided circumferentially distributed on the at least one bearing element that is not circumferentially closed, and
f) the at least one bearing element formed as a ring that is not circumferentially closed is cut to length from a strip,
the at least one bearing element formed as a ring further comprises radial webs, which in each case connect two of the one or more axial bearing sections and/or two of the one or more radial bearing sections with one another,
the radial webs have a circumferential length, an axial width and a radial strip thickness,
the one or more axial bearing sections have a circumferential length, a radial width and an axial thickness,
the one or more radial bearing sections have a circumferential length, an axial width and a radial thickness, and
the radial strip thickness of the radial webs of the at least one bearing element formed as a ring is smaller than the axial thickness of the one or more axial bearing sections and/or the radial thickness of the one or more radial bearing sections.

2. The viscous torsional vibration damper as claimed in claim 1, wherein
the strip is a straight strip.

3. The viscous torsional vibration damper as claimed in claim 1, wherein
individual ones of the radial bearing sections and individual ones of the axial bearing sections are arranged circumferentially adjacent to one another in an L-shape.

4. The viscous torsional vibration damper as claimed in claim 1, wherein
the at least one bearing element includes two bearing elements that are arranged in the damper chamber.

5. The viscous torsional vibration damper as claimed in claim 1, wherein
the damper chamber has a substantially rectangular cross section with inner and outer corner regions.

6. The viscous torsional vibration damper as claimed in claim 5, wherein
the at least one bearing element includes two bearing elements that are arranged in the outer corner regions of the damper chamber between the damper housing and the inertia ring.

7. The viscous torsional vibration damper as claimed in claim 5, wherein
the at least one bearing element is comprised of two bearing elements that are arranged of the damper chamber between the damper housing and the inertia ring.

8. The viscous torsional vibration damper as claimed in claim 5, wherein
the at least one bearing element is comprised of two bearing elements with one of the two bearing elements arranged in one of the outer corner regions and the other of the two bearing elements arranged in one of the inner corner regions of the damper chamber between the damper housing and the inertia ring.

9. The viscous torsional vibration damper as claimed in claim 8, wherein
the one of the outer corner regions and the one of the inner corner regions are located diagonally opposite one another in the damper chamber.

10. The viscous torsional vibration damper as claimed in claim 1, wherein
the at least one bearing element is arranged between the damper housing and the inertia ring without preload.

11. The viscous torsional vibration damper as claimed in claim 1, wherein
the at least one bearing element includes only the radial webs, and the radial webs connect only the radial bearing sections.

12. The viscous torsional vibration damper as claimed in claim 1, wherein
the at least one bearing element is made of plastic.

13. The viscous torsional vibration damper as claimed in claim 1, wherein
the at least one bearing element is formed in one piece.

14. The viscous torsional vibration damper as claimed in claim 1, wherein
the one of more axial bearing sections is comprised of three axial bearing sections and/or the one of more radial bearing sections is comprised of three radial bearing sections provided circumferentially distributed on the at least one bearing element.

15. A method for producing a bearing element for a bearing device of a viscous torsional vibration damper, the method comprising the steps of:
   (a) providing a strip comprising one or more axial bearing sections, one or more radial bearing sections, and one or more radial webs connecting the axial bearing sections and/or the radial bearing sections with one another;
   (b) cutting the bearing element to length from the provided strip; and
   (c) laying the bearing element cut to length from step (b) into a provided open damper housing on a bearing seat, wherein
   the one or more radial webs have a circumferential length, an axial width and a radial strip thickness,
   the one or more axial bearing sections have a circumferential length, a radial width and an axial thickness,
   the one or more radial bearing sections have a circumferential length, an axial width and a radial thickness, and
   the radial strip thickness of the one or more radial webs of the bearing element formed as a ring is smaller than the axial thickness of the one or more axial bearing sections and/or the radial thickness of the one or more radial bearing sections.

16. The method as claimed in claim 15, wherein
the bearing element cut to length is bent during step (c) into a shape of a ring that is not circumferentially closed.

17. The method as claimed in claim 16, wherein
the bearing element cut to length, during step (b) is bent into the shape of the ring that is not circumferentially closed with a ring diameter corresponding to a diameter of the bearing seat such that the ring is insertable into the bearing seat.

* * * * *